United States Patent [19]

Edling

[11] 4,344,251

[45] Aug. 17, 1982

[54] SELF-IRRIGATING POT FOR PLANTS

[75] Inventor: Robert J. Edling, Baton Rouge, La.

[73] Assignee: The Board of Regents of the University of Nebraska, Lincoln, Nebr.

[21] Appl. No.: 227,814

[22] Filed: Jan. 23, 1981

Related U.S. Application Data

[63] Continuation-in-part of Ser. No. 57,303, Jul. 13, 1979, abandoned.

[51] Int. Cl.³ .............................................. A01G 25/00
[52] U.S. Cl. ...................................................... 47/80
[58] Field of Search ................................ 47/66, 79–81

[56] References Cited

U.S. PATENT DOCUMENTS

| | | | |
|---|---|---|---|
| 681,672 | 9/1901 | Andrews | 47/80 |
| 1,623,720 | 4/1927 | Ellis | 47/79 |
| 2,406,439 | 8/1946 | Pratt | 47/79 |
| 2,484,909 | 10/1949 | Ritter | 47/79 |
| 2,651,884 | 9/1953 | Werner | 47/80 |
| 3,137,096 | 6/1964 | Hopkins | 47/79 |
| 3,576,088 | 4/1971 | Arca | 47/81 |
| 3,739,524 | 6/1973 | Rose | 47/81 |
| 4,173,098 | 11/1979 | Smith | 47/84 X |

FOREIGN PATENT DOCUMENTS

| | | | |
|---|---|---|---|
| 12057 | of 1896 | United Kingdom | 47/81 |
| 22647 | of 1912 | United Kingdom | 47/80 |
| 1098155 | 1/1968 | United Kingdom | 47/81 |

*Primary Examiner*—James R. Feyrer
*Attorney, Agent, or Firm*—Vincent L. Carney

[57] ABSTRACT

To provide water to a plant in a standard pot, a removable, preassembled plastic separator disc fits within the walls of the pot near its bottom to form a soil compartment above it for the roots of the plant and a water reservoir beneath it. Water is supplied to the soil for the plant by a porous plug that extends through the center of the plastic divider into the water compartment below it. Water is added to the water compartment through a first plastic tube and air is displaced through a second plastic tube both of which extend through the disc and soil. The separator disc is preassembled into a kit with porous plug and tubes to fit standard tapered pots.

4 Claims, 2 Drawing Figures

SELF-IRRIGATING POT FOR PLANTS

RELATED CASES

This application is a continuation-in-part of U.S. patent application Ser. No. 057,303, filed July 13, 1979, now abandoned, for SELF-IRRIGATING POT FOR PLANTS by Robert Joe Edling and assigned to The Board of Regents of the University of Nebraska.

BACKGROUND OF THE INVENTION

This invention relates to irrigators for potted plants.

In one class of irrigator for potted plants, the pot includes a water reservoir to slowly provide water to the soil supporting the plant so that the plant does not need as frequent watering as would be the case if there were no water reservoir.

In a prior art type of irrigator for potted plants of this class, the reservoir is within a compartment along the sides and the bottom of the soil containing compartment. The water is prevented from flowing into and saturating the soil by vacuum pressure within the reservoir. In another type of prior art irrigator of this class, the reservoir is entirely beneath the soil compartment and communicates with the soil through porous wicks. The porous wicks are adjusted by a lever or the like so as to have differing amounts of contact surfaces with the soil to control the amount of water entering the soil. Both of these two types of prior art pots have the disadvantage of being complex and expensive.

In still another type of prior art irrigator of this class, the reservoir of water is entirely beneath the soil compartment but is in a container which also surrounds the soil container so that it is exposed to air or is exposed to air through large diameter tubes. This type has the disadvantages of being relatively expensive and of permitting rapid evaporation of the water directly from the reservoir.

In still another type of prior art irrigator of this class, the compartment is formed of a porous separator in communication with the air through porous tubes. This type of irrigator has a disadvantage in that, in time, soil seeps through the pores and fills or clogs the compartment and tubes.

In still another type of prior art irrigator of this class, the separator rests upon specially formed members in the sides of the open-topped pot. This type of irrigator has the disadvantage of being expensive because of the specially formed members.

SUMMARY OF THE INVENTION

Accordingly, it is an object of this invention to provide a novel irrigator for potted plants.

It is a further object of the invention to provide a novel method for applying water to horticultural plants.

It is a still further object of the invention to provide a novel inexpensive self-irrigating pot which supplies water to soil by capillary action only.

It is a still further object of the invention to provide a novel irrigator that is a relatively inexpensive insert for standard pots.

It is a still further object of the invention to provide an irrigator which substantially seals the water from the outside atmosphere where it may evaporate except for a capillary path through the soil.

In accordance with the above and further objects of the invention, an irrigator which fits into a standard pot includes a separating plate or disc that rests against the tapered walls of the pot and has a capillary wick extending through it. Tubes for filling the reservoir extend through the disc and the soil in the pot. The separator separates a lower water compartment from an upper soil compartment that accommodates the plant in the pot.

As can be understood from the above description, the irrigator of this invention has several advantages, such as: (1) it is inexpensive; (2) it is simple to use; (3) it reduces the number of times potted plants must be watered; (4) it is durable; and (5) it can be reused. It is inexpensive because it may be made from a plastic disc with a wick extending through it and tubes to fill a reservoir with water. It is adapted to simply fit within standard pots.

SUMMARY OF THE DRAWINGS

The above noted and other features of the invention will be better understood from the following detailed description when considered with reference to the accompanying drawings in which.

SPECIFIC DESCRIPTION

Figure 1:
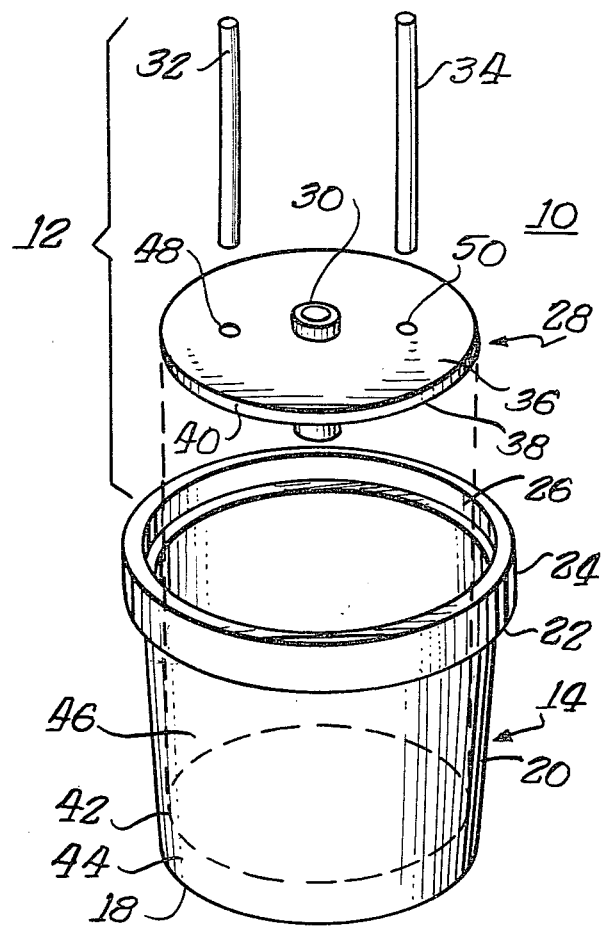
FIG. 1 is a simplified, exploded perspective view of an irrigator in accordance with an embodiment of the invention.

In FIG. 1, there is shown a self-irrigating pot 10 for plants comprising an irrigator 12 and a pot 14. The irrigator 12 fits within the pot 14 to confine water beneath the soil.

The pot 14 includes a circular bottom wall 18, sloping side walls 20 which taper upwardly from the circular bottom wall 18 to form generally an inverted frustrum ending at their upper side in a shoulder 22 from which relatively short upwardly extending cylindrical side walls 24 extend to form an opening 26. The pot 14 is generally formed of plastic and is solid, imperforate, impermeable to water and continuous except for the opening 26 so as to be able to contain water without leakage.

The irrigator 12 includes a plastic horizontal central disc 28, a center ceramic plug 30, and two upright tubes 32 and 34. The plastic horizontal central disc 28 is made of plastic and has an upper large flat surface 36 and a bottom flat surface 38 with a rim 40 which is tapered inwardly and downwardly to have substantially the same angle as the sloping side walls 20 of the pot 14. It is impermeable to water except for openings to receive the center ceramic plug 30 and upright tubes 32 and 34.

The diameter of the plastic horizontal central disc 28 is such that it fits within the sloping side wall 20 of the pot 14 tightly at a location such as indicated at 42 to separate the interior of the pot 14 into a bottom reservoir 44 and a top soil and plant holding compartment 46. Discs are prepared of standard sizes so that they may be sold with center plug and tubes as a kit but separately from the pot. In this circumstance, it is preferable for the center plug and tubes to be attached or readily attachable to the disc.

The center ceramic plug 30 has a longitudinal axis which is perpendicular to the flat surfaces 36 and 38 of the plastic horizontal central disc 28 and passes through the center of the disc to point directly at the center of the circular bottom wall 18 of the pot 14 when the plastic horizontal central disc 28 is in place. It extends downwardly into the bottom reservoir 44 to a point a slight distance above the circular bottom wall 18 of the pot 14 from a point a slight distance above upper flat surface 36 of the disc although that is not necessary. It is only necessary for the plug to pass water to the soil from the reservoir but it is preferable for it to be stiff and of standard size for economy in use.

On either side of the center ceramic plug 30 in the plastic horizontal central disc 28 are first and second side apertures 48 and 50 which are of such a size as to receive the bottom end of the upright tubes 32 and 34 which extend upwardly therefrom to communicate with the bottom reservoir 44 through the side apertures 48 and 50.

The plastic horizontal central disc 28 and the pot 14 may be of any suitable material but are conveniently made of a plastic both to reduce the cost and to form a suitable material for holding water. The plastic horizontal central disc 28 must be of sufficient thickness and the material must be of sufficient strength to support the soil and plant within the pot 14. It must also be impermeable to water or substantially impermeable to water.

The center ceramic plug 30 is intended to provide capillary action between the bottom reservoir 44 for the water therein and the top of the plastic horizontal central disc 28. For that purpose, the section which extends below the plastic horizontal central disc 28 towards the circular bottom wall 18 of the pot 14 is a sufficient size to extend almost to the bottom so as to contact the water.

While many suitable capillary materials are known, it may be conveniently formed from a section of tubular moisture extractors such as the type sold by Soil-Moisture Equipment Corporation of California for sampling the moisture of ground. The tube section is filled with granulated soil, fine sand or other capillary material and sealed at its bottom. The plastic horizontal central disc 28 and the pot 14 may be of polyethylene.

The upright tubes 32 and 34 should be of sufficient height to extend from the side apertures 48 and 50 upwardly above the soil so that one of them may be used to receive water for supplying the bottom reservoir 44 while the other serves to provide an exit to air as the water is supplied to the first of the tubes. They need not extend any substantial distance through the plastic horizontal central disc 28 and one should be above the water level to permit escape of air. Their cylindrical walls should be imperforate and impermeable to water.

The inner diameter of the upright tubes 32 and 34 and of the center ceramic plug 30 are related to the size of the pot. Generally, the tubes must have a sufficiently large inner diameter to permit the ready application of water through a funnel or the like to the water compartment without permitting excessive evaporation for the size of the water compartment. The center ceramic plug 30 must have a diameter of porous material which is sufficiently large to supply moisture to the soil. Generally, the inner diameter of each of the upright tubes 32 and 34 should not be greater than 5 percent of the diameter of the pot 14 and the diameter of the porous portion of the plug should not be greater than 30 percent of the diameter of the pot 14.

The plastic horizontal central disc 28 must be sufficiently thick so that for a given material, it is strong enough to hold the soil above it. Since there are a variety of materials which may be used, there is great flexibility in the thickness. The beveled edge will have an angle of less than 45 degrees with respect to a circle perpendicular to its surface and parallel to an axis passing through its center.

Figure 2:
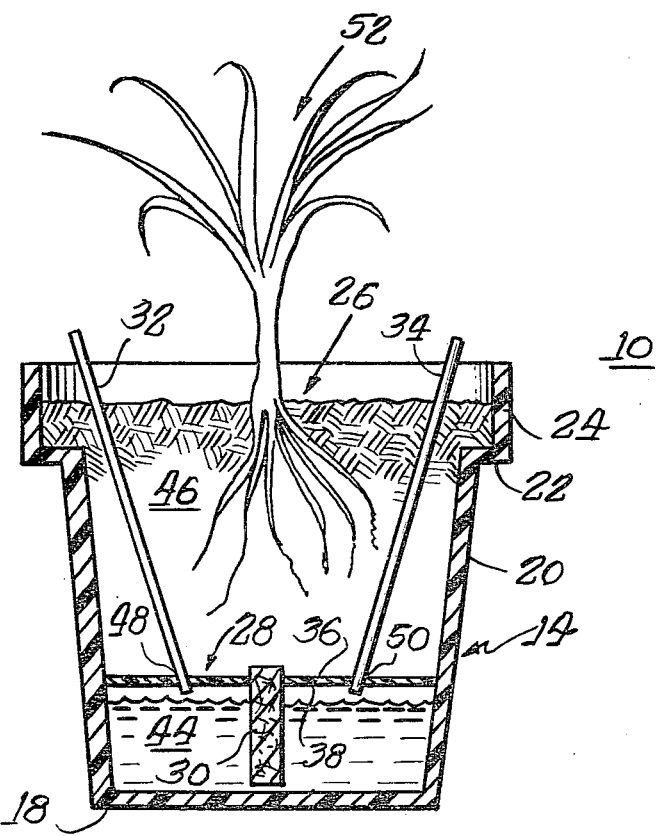
FIG. 2 is a sectional view of the irrigator of FIG. 1.

As best shown in FIG. 2, the bottom reservoir 44 is filled with water and the top soil and plant holding compartment 46 with soil for a plant indicated generally at 52 to grow. To form the compartments 44 and 46, the plastic horizontal central disc 28 is dropped into the pot 14. It is of such a size that it comes to rest near the bottom, but spaced from the circular bottom wall 18 of the pot 14 with its beveled sides resting against and adjacent to the side of the inner wall of the pot 14.

To provide water to the plant 52, water is inserted into the bottom reservoir 44 under some circumstances before the plastic horizontal central disc 28 is inserted in place and to replenish it or add it initially if not done before the plastic horizontal central disc 28 is inserted, water is poured through the upright tube 32. As water passes through the upright tube 32, the air which is displaced exits through the upright tube 34.

The top soil and plant holding compartment 46 is filled with the soil in which to grow the plant 52. Consequently, the upright tubes 32 and 34 must be sufficiently firm to avoid being crushed by the weight of the soil. Otherwise, they only need be sufficiently sturdy to accommodate the water and to extend upwardly through the soil. Plastic tubes of polyethylene are adequate. The connections around the upright tubes 32 and 34 and the center ceramic plug 30 need only be sufficient to avoid excessive leaking of the soil into the bottom reservoir 44.

To provide water to the plant 52 while growing, the porous center ceramic plug 30 extends into the water in the bottom reservoir 44 and upwardly through the plastic horizontal central disc 28. Water is drawn by capillary action into the soil in the top soil and plant holding compartment 46 and upwardly by capillary action to the roots of the plant 52. Because water rises upwardly by capillary action only, there is sufficient air within the soil for the requirement of the growth of the plant 52.

As can be understood from the above description, the self-irrigating pot of this invention has several advantages, such as: (1) it is inexpensive; (2) it is simple to use; (3) it avoids the need for watering the plant except at infrequent intervals; (4) it is durable; and (5) it is reusable.

The most attractive feature of the irrigating pot is its low cost. The pot 14 may be any standard pot, some of which are very inexpensive such as plastic pots. The plastic horizontal central disc 28 can be made from readily available materials or purchased and the center ceramic plug 30 is available commercially as a water extractor at a very low cost and is easy to assemble through a hole in the plastic horizontal central disc 28. The remaining parts which are only the upright tubes 32 and 34 are readily available.

It is easy to assemble this pot and it is adaptable to a number of different horticultural uses. It has been found that some plants may be grown with watering only five or six times a year and most plants require relatively infrequent irrigation when grown within the pot.

Although a preferred embodiment of this invention has been described with some particularity, many modifications and variations in the invention are possible within the light of the above teachings. Therefore, it is to be understood that, within the scope of the appended claims, the invention may be practiced other than as specifically described.

What is claimed is:

1. A kit adapted to form an irrigator together with a standard horticultural pot, comprising:
- a disc formed of material impermeable to water and having a diameter larger than the bottom inner diameter of standard pots and smaller than the inner diameter of the top of standard pots;
- said disc having edges beveled to conform with the angle of the inner wall of standard tapered pots;
- a central aperture in said disc;
- a cylindrical ceramic porous material having an outer diameter substantially equal to the inner diameter of said central aperture;
- a first radial aperture;
- a first cylindrical tube having walls impermeable to water and an outer diameter substantially equal to the inner diameter of said first aperture;
- a second cylindrical aperture radially offset from said central aperture of said disc;
- a second cylindrical tube having walls impermeable to water and of substantially the same size as said second circular aperture;
- said central ceramic plug having an outer diameter which is less than 30 percent of the outer diameter of said divider disc; and
- said first tube having an outer diameter less than 5 percent of the outer diameter of said divider disc.

2. An irrigator for providing water to soil comprising:
- a pot having imperforate bottom and side walls and an open top adapted to hold the soil within the side walls;
- the side walls of said pot having an inner surface which is tapered outwardly at a predetermined angle;
- a disc-shaped removable separator mounted at a location near the bottom of said pot to form a top and a bottom compartment therein;
- said separator having a central cylindrical aperture and two radially located cylindrical apertures therein;
- a cylindrical capillary wick passing through said central aperture and extending above said separator and below said separator;
- a first cylindrical tube having walls impermeable to water passing through one of said radial apertures and extending to a location sufficiently close to the top of said pot to extend above the soil within the side walls;
- a second cylindrical tube having cylindrical walls impermeable to water and extending through the other of said radially located apertures to a location near the top of said pot, whereby water may flow through one of said tubes with air being exhausted from said compartment through the other tube to supply water to said lower compartment;
- said divider being a plastic disc;
- said wick being a stiff ceramic wick;
- said divider having beveled edges, whereby said edges of said divider rest near the bottom against said wall with a substantially cylindrical sealing relationship;
- said first and second cylindrical tubes having imperforate polyethylene walls;
- said wick having ceramic side and bottom walls and being filled with soil;
- said central aperture having a diameter which is less than 30 percent of the diameter of said separator;
- one of said first and second tubes having an inner diameter which is less than 5 percent of the outer diameter of said separator.

3. An irrigator for providing water to soil comprising:
- a pot having imperforate bottom and side walls and an open top and adapted to hold the soil within the side walls;
- the side walls of said pot having an inner surface which is tapered outwardly at a predetermined angle;
- a disc-shaped removable separator mounted at a location near the bottom of said pot to form a top and a bottom compartment therein;
- said separator having a central cylindrical aperture and two radially located cylindrical apertures therein;
- a cylindrical capillary wick passing through said central aperture and extending above said separator and below said separator;
- a first cylindrical tube having walls impermeable to water passing through one of said radial apertures and extending to a location sufficiently close to the top of said pot to extend above the soil within the side walls;
- a second cylindrical tube having cylindrical walls impermeable to water and extending through the other of said radially located apertures to a location near the top of said pot, whereby water may flow through one of said tubes with air being exhausted from said compartment through the other tube to supply water to said lower compartment;
- said divider being a plastic disc;
- said wick being a stiff ceramic wick;
- said divider having beveled edges, whereby said edges of said divider rest near the bottom against said wall with a substantially cylindrical sealing relationship;
- said first and second cylindrical tubes having imperforate walls;
- said wick having ceramic side and bottom walls and being filled with soil;
- said central aperture having a diameter which is less than 30 percent of the diameter of said separator; and
- one of said first and second tubes having an inner diameter which is less than 5 percent of the outer diameter of said separator.

4. A method of irrigating plants comprising the steps of:
- forming a divider of a meterial impermeable to water and having the shape of a disc with an edge beveled to an angle less than 45 degrees with respect to a circle perpendicular to the surface of the disc with a central aperture and two radially spaced smaller apertures;
- inserting a porous plug in the center aperture of the divider, which porous plug is relatively stiff, extends below the disc and has a diameter less than 30 percent of the diameter of the divider;
- inserting a first cylindrical tube having walls impervious to water and having an inner diameter of less than 5 percent of the diameter of the disc into a first of said two radial apertures;
- inserting a second cylindrical tube having walls impermeable to water and an inner diameter less than 5 percent of the diameter of said disc into said second radial aperture;

inserting said disc into a pot having side walls the inner surfaces of which substantially match the angle of bevel of the disc and having an open end of greater inner diameter than the diameter of said disc and a wall portion spaced from the bottom of the pot with a smaller inner diameter than the diameter of said disc, whereby said disc forms a divider in said pot to form two compartments;

inserting water through a first of said two tubes into said lower compartment;

putting soil in the upper compartment;

growing plants in the upper compartment in the soil;

permitting water to pass from the lower compartment to the upper compartment by capillary action through said central plug;

the step of putting water in the lower compartment including the step of applying water through one of said tubes passing through said divider while air escapes through the other of said tubes.

* * * * *